(12) United States Patent
Arbuckle (10) Patent No.: US 8,050,630 B1
(45) Date of Patent: Nov. 1, 2011

(54) METHOD FOR MONITORING THE OPERATION OF A GLOBAL POSITION SYSTEM RECEIVER

(75) Inventor: Jason S. Arbuckle, Horicon, WI (US)

(73) Assignee: Brunswick Corporation, Lake Forest, IL (US)

( * ) Notice: Subject to any disclaimer, the term of this patent is extended or adjusted under 35 U.S.C. 154(b) by 275 days.

(21) Appl. No.: 12/431,035

(22) Filed: Apr. 28, 2009

(51) Int. Cl.
  *H04B 17/00* (2006.01)
  *G01S 19/23* (2010.01)
(52) U.S. Cl. ............ 455/67.11; 455/226.1; 342/357.62
(58) Field of Classification Search ............. 342/357.62, 342/357.63, 357.76, 357.77, 357.74; 455/67.11, 455/67.14, 226.1–226.4; G01S 19/23, 19/34; H04B 17/00
See application file for complete search history.

(56) References Cited

U.S. PATENT DOCUMENTS

| | | | |
|---|---|---|---|
| 3,922,636 A * | 11/1975 | Narbaits-Jaureguy et al. | 340/993 |
| 5,203,025 A * | 4/1993 | Anvari et al. | 455/134 |
| 5,263,175 A * | 11/1993 | Dejmek | 455/10 |
| 5,451,964 A | 9/1995 | Babu | |
| 5,736,962 A | 4/1998 | Tendler | |
| 5,752,165 A * | 5/1998 | Hokkanen | 455/67.11 |
| 6,114,955 A * | 9/2000 | Brunius et al. | 340/539.24 |
| 6,121,923 A | 9/2000 | King | |
| 6,273,771 B1 | 8/2001 | Buckley et al. | |
| 6,407,701 B2 | 6/2002 | Ito et al. | |
| 6,485,341 B1 | 11/2002 | Lanyi et al. | |
| 6,559,793 B1 | 5/2003 | Eschenbach | |
| 6,727,848 B2 | 4/2004 | Eschenbach | |
| 6,775,615 B2 | 8/2004 | Yule | |
| 6,842,715 B1 | 1/2005 | Gaal | |
| 6,853,840 B2 * | 2/2005 | Najafi | 455/410 |
| 6,885,919 B1 | 4/2005 | Wyant et al. | |
| 7,046,964 B1 * | 5/2006 | Sullivan et al. | 455/67.11 |
| 7,209,728 B2 * | 4/2007 | Ogura | 455/343.1 |
| 7,267,068 B2 | 9/2007 | Bradley et al. | |
| 7,305,928 B2 | 12/2007 | Bradley et al. | |
| 7,446,700 B2 | 11/2008 | Yu et al. | |
| 2003/0162539 A1 * | 8/2003 | Fiut et al. | 455/424 |
| 2007/0025287 A1 * | 2/2007 | Goren et al. | 370/328 |
| 2007/0040740 A1 * | 2/2007 | Abraham et al. | 342/357.12 |
| 2009/0295631 A1 * | 12/2009 | Wu et al. | 342/357.12 |

* cited by examiner

*Primary Examiner* — Thomas Tarcza
*Assistant Examiner* — John Vigushin
(74) *Attorney, Agent, or Firm* — William D. Lanyi (57) ABSTRACT

A method is provided for determining the validity of a signal received by a GPS receiver. A signal that is unfiltered, either mathematically or electronically, is monitored to determine the variability of different occurrences of the signal. These occurrences, which may be sequential, are compared to each other in order to detect whether or not variation exists between one occurrence of the signal and a subsequent occurrence of the signal. If no variation exists, it is determined that the signal is invalid and that a loss of fix of the satellite signal has occurred. If sufficient variability exists in the signal, between successive occurrences, the signal is deemed to be valid and suitable for use to control a vehicle such as a marine vessel.

13 Claims, 9 Drawing Sheets

METHOD FOR MONITORING THE OPERATION OF A GLOBAL POSITION SYSTEM RECEIVER

BACKGROUND OF THE INVENTION

1. Field of the Invention

The present invention is generally related to the use of a global positioning system (GPS) and, more particularly, to a method for monitoring the operability of a GPS receiver in order to determine, or verify, the validity of the signals being received by the receiver from global positioning satellites.

2. Description of the Related Art

Since the initial conception of a global positioning system (GPS), with a number of satellites transmitting data for receipt by GPS receivers, many different improvements and applications have been developed. These improvements include numerous data handling and error reduction techniques and numerous strategies to increase the speed and reliability of the data transmission, reception, and handling used in the determination of a global position of a GPS receiver.

U.S. Pat. No. 5,451,964, which issued to Babu on Sep. 19, 1995, describes a method and system for resolving double difference GPS carrier phase integer ambiguity utilizing decentralized Kalman filters. A reference station is provided at precisely known coordinates and carrier phase data and pseudoranges for each received GPS satellites are calculated at both the reference station and the mobile GPS receiver. A communication link couples carrier phase data, pseudorange data and the known reference station position from the reference station to the mobile GPS receiver. A first Kalman filter within the mobile GPS receiver operates on GPS satellite ephemeris parameters and the calculated pseudoranges to obtain an error state vector for position and time. The GPS satellite ephemeris parameters and calculated carrier phase data are then applied to a second Kalman filter to obtain a predicted vector of velocity and clock rate error. Line of site range and range rates are then estimated utilizing the outputs of both Kalman filters and utilized, together with double difference phase measurements, to resolve the double difference carrier wave integer ambiguity providing an accurate set of coordinates for the mobile GPS receiver.

U.S. Pat. No. 5,736,962, which issued to Tendler on Apr. 7, 1998, describes the time since last fix annunciation system for GPS-based wireless rescue systems. It is used in a wireless emergency location system in which a cellular phone is utilized to communicate the location of an individual or vehicle by announcing position based on the output of a GPS receiver, time since last fix is computed and annunciated to permit emergency personnel to ascertain if the position information is valid. The velocity and direction of travel can also be annunciated for permitting emergency personnel to calculate the location of the phone and thus a certain individual.

U.S. Pat. No. 6,121,923, which issued to King on Sep. 19, 2000, describes a fixed site and satellite data-aided GPS signal acquisition method and system. It includes lengthening a pre-detection integration interval so that weak signals can be detected by operating coherently on captured signals. Coherency is insured by relying on the predictability of the satellite signal's data pattern. The described method significantly reduces correlation resolution time based on applying information regarding code phase delays from each satellite in view to reduce to code search space for other satellites being correlated.

U.S. Pat. No. 6,273,771, which issued to Buckley et al. on Aug. 14, 2001, discloses a control system for a marine vessel. A control system for a marine vessel incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices, such as a GPS receiver, to the plurality of devices in signal communication with the bus whereby the controller is connected in signal communication with each of the plurality of devices on the communication bus.

U.S. Pat. No. 6,407,701, which issued to Ito et al. on Jun. 18, 2002, describes a GPS receiver capable of calculating accurate 2DRMS. In the GPS receiver, GPS solutions are calculated by performing GPS measurements using a Kalman filter. The GPS receiver is provided with a computing system which calculates 2DRMS according to a predefined equation.

U.S. Pat. No. 6,485,341, which issued to Lanyi et al. on Nov. 26, 2002, discloses a method for controlling the average speed of a vehicle. The method is described with reference to selecting a desired average speed, measuring an actual speed, and maintaining a cumulative error determined as a function of the difference between the average speed and actual speed and the time over which the actual speed measurement was taken. Based on the cumulative total of speed-time error, a compensatory speed is calculated that will reduce the cumulative speed time-error to an acceptable tolerance range within a selected period of elapsed time.

U.S. Pat. No. 6,559,793, which issued to Eschenbach on May 6, 2003, describes a differential global positioning system using a coarse GPS data for a fast time to a precise first fix. A differential global positioning system (DGPS) using coarse data for the locations in space of GPS satellites for ranging to the GPS satellites and then determining a precise differentially corrected GPS location of a GPS user receiver is described. The coarse GPS data can be GPS almanac data or non-current GPS ephemeris data as long as the same data is used by both a GPS reference receiver and the GPS user receiver.

U.S. Pat. No. 6,727,848, which issued to Eschenbach on Apr. 27, 2004, describes a global positioning system using almanac data for a fast time to first fix. A system using coarse GPS orbital parameters for providing a precise GPS location is described. It includes a GPS reference receiver and a GPS user receiver. Coarse locations in space of GPS satellites are computed from almanac or old ephemeris data.

U.S. Pat. No. 6,775,615, which issued to Yule on Aug. 10, 2004, describes a method of obtaining a position fix in a GPS receiver and a GPS receiver for the same. The method comprises the steps of providing an estimate of clock offset between the GPS receiver and the GPS satellite, measuring a set of pseudoranges from the GPS receiver to GPS satellite, and either resolving the set of pseudoranges to obtain a position fix or providing an estimate of the position of the GPS receiver, resolving the set of pseudoranges to obtain a position fix correction, and obtaining a position fix using the estimate of the position of the GPS receiver and the position fix correction, wherein resolving the pseudoranges does not involve resolving the pseudoranges for either a new clock offset or clock offset correction.

U.S. Pat. No. 6,842,715, which issued to Gaal on Jan. 11, 2005, describes multiple measurements per position fix improvements. Methods and apparatus for improved position determination of a device using multiple pseudorange measurements for transmitting sources at known locations, such as GPS satellites, is described. A plurality of pseudorange measurements for each transmitting source is processed together to obtain a simplified maximum likelihood estimate for the pseudorange for that transmitting source of a common reference time.

U.S. Pat. No. 6,885,919, which issued to Wyant et al. on Apr. 26, 2005, discloses a method for controlling the operation of a marine vessel. A process is provided by which the operator of a marine vessel can invoke the operation of a computer program that investigates various alternatives that can improve the range of the marine vessel. The distance between the current location of the marine vessel and a desired waypoint is determined and compared to a range of the marine vessel which is determined as a function of available fuel, vessel speed, fuel usage rate, and engine speed. The computer program investigates the results that would be achieved, theoretically, from a change in engine speed. Both increases and decreases in engine speed are reviewed and additional theoretical ranges are calculated as a function of those new engine speeds. The operator of the marine vessel is informed when an advantageous change in engine speed is determined.

U.S. Pat. No. 7,267,068, which issued to Bradley et al. on Sep. 11, 2007, discloses a method for maneuvering a marine vessel in response to a manually operable control device. A marine vessel is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,305,928, which issued to Bradley et al. on Dec. 11, 2007, discloses a method for positioning a marine vessel. A vessel positioning system maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 7,446,700, which issued to Yu et al. on Nov. 4, 2008, describes methods and apparatus for decreasing time to first fix of GPS receiver. It provides a GPS receiver which is capable of computing a local time reference without employing RTC circuitry and employing a nonvolatile storing unit to store backup navigation data, wherein the local time reference and the backup navigation data can be used to reduce the TTFF of the GPS receiver. The GPS receiver includes a nonvolatile storing unit and a positioning unit. The positioning unit is capable of retrieving the backup navigation data from the nonvolatile storing unit and computing a local time reference after the GPS receiver is powered up. The positioning unit is further capable of employing the backup navigation data and the local time reference to computing the position of the GPS.

The patents described above are hereby expressly incorporated by reference in the description of the present invention.

Under certain circumstances, a receiver can experience a loss of GPS fix. When that happens, information relating to the global position of the receiver, as calculated by the software in the microprocessor of the receiver, becomes untrustworthy. In many applications, a temporary loss of fix is not extremely serious and, if the fix is regained within a relatively short period of time, the loss of fix is sometimes not even noticed. However, in other applications, a loss of fix can be very serious. For example, when a vehicle (e.g. a marine vessel) is being automatically controlled as a function of its GPS position, a loss of fix can cause a dangerous condition. It would therefore be very beneficial if a method could be provided for quickly and reliably detecting a loss of GPS fix condition and reporting that status to an operator of the vehicle. In addition, it would be significantly beneficial if, upon the detection of a loss of GPS fix, an alarm condition could be generated to halt all potentially dangerous actions that might subsequently be taken based on invalid information calculated on the assumption that the receiver was receiving valid and reliable information when, in fact, it was not because of a loss of fix.

SUMMARY OF THE INVENTION

A method for monitoring the operation of a global positioning system receiver, in accordance with a preferred embodiment of the present invention, comprises the steps of determining a magnitude of a difference between two occurrences of a first signal, comparing the magnitude of the difference to a preselected threshold value, and identifying an operating condition of the receiver as a function of the relative magnitudes of the difference between the two occurrences and the selected threshold value. In a preferred embodiment of the present invention, the first signal comprises a plurality of serial occurrences and the comparing step comprises the steps of subtracting one of the two occurrences from another of the two occurrences to calculate the difference between the two occurrences. The two occurrences of the first signal can be sequential occurrences but this is not required in all embodiments of the present invention. The identifying step can comprise the step of determining that the receiver is inoperative if the absolute value of the difference is not greater than the preselected threshold value. The method of the present invention, in a preferred embodiment, can further comprise the step of causing an alarm to be generated when the identifying step determines that the difference is less than or equal to the threshold value. In a preferred embodiment of the present invention, the first signal is unfiltered. The operating condition in a preferred embodiment of the present invention is the validity of the first signal.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Those skilled in the art of the use of GPS receivers to determine the position of the receiver are familiar with many different applications that can be used to detect the position of the receiver on the earth. When a GPS receiver is used to provide information relating to the navigation of a vehicle, and the propulsion of the vehicle is automatically controlled by a microprocessor that uses the GPS information, it is critically important that any type of malfunction that affects the validity of the data be recognized quickly so that corrective action can be taken and so that potentially harmful actions based on invalid data can be avoided.

Figure 1:
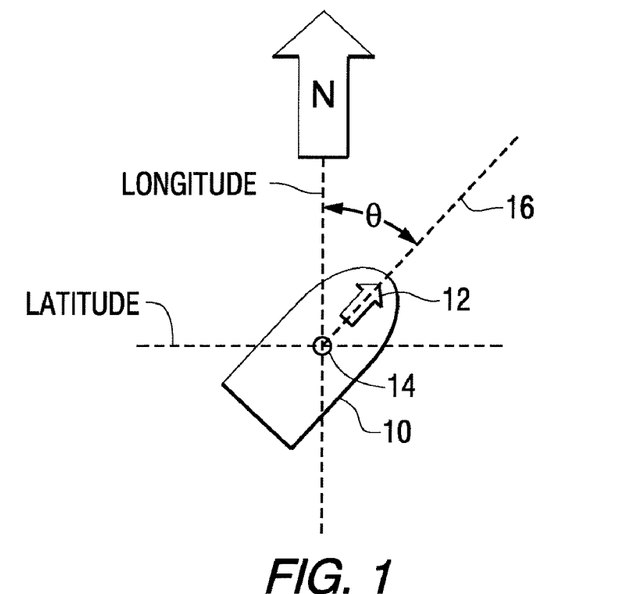
FIG. 1 is a schematic representation of a marine vessel in relation to a longitude and latitude position.

Before describing the basic concepts involved in preferred embodiments of the present invention, it will be helpful if certain terminology is defined so that later descriptions are more easily understandable. FIG. 1 is a highly simplified schematic representation of a marine vessel 10 shown in relation to a particular longitude and latitude that intersect at a location on the marine vessel (e.g. at the boat's center of gravity) which is used as the representative location of the boat 10. For purposes of reference, the north direction is illustrated in FIG. 1 and a small block arrow 12, which is aligned with the keel of the marine vessel 10, is used to illustrate the direction in which the boat is heading. For these purposes, the "heading" of the marine vessel simply refers to the direction in which the boat is pointed. This direction, which is also represented by dashed line 16, can be identified by its angular magnitude with reference to the north direction. This angular magnitude is identified as $\theta$. If the marine vessel 10 is propelled in the direction represented by arrow 12, along dashed line 16, its "course over ground", or COG, would be identified as angle $\theta$. This information would describe the direction in which the center of gravity 14 would travel. It should be noted, however, that the marine vessel 10 can possibly move in directions which are not perfectly aligned with its keel. This type of movement can occur as a result of the effects of current, tides, or wind that may move the boat even when its propulsion system is inactive.

Figure 2:
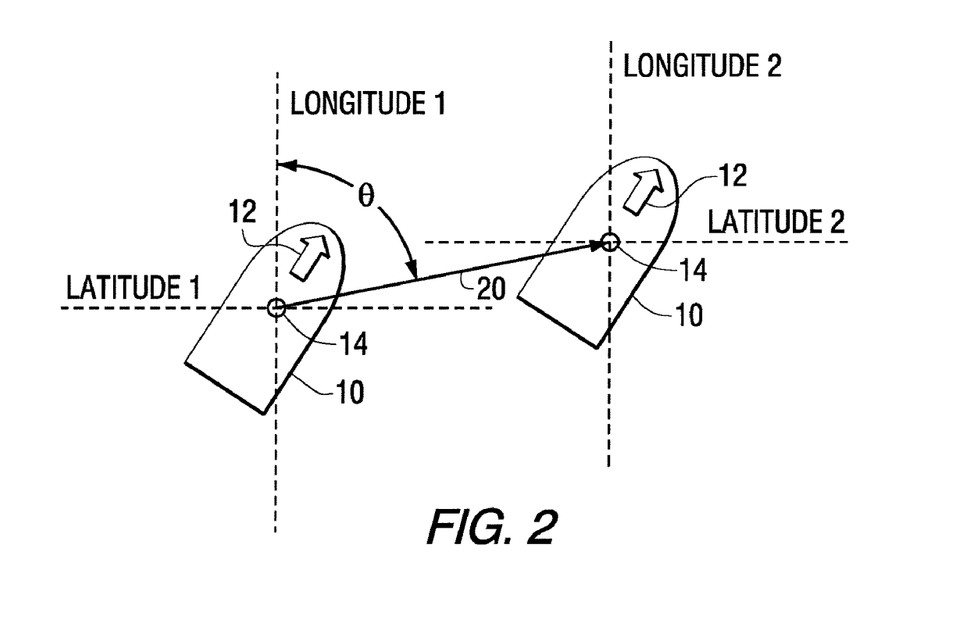
FIG. 2 shows sequential positions of a marine vessel.

FIG. 2 illustrates two sequential positions of a marine vessel 10. These positions are identified by their respective intersections of LONGITUDE1 and LATITUDE1 and LONGITUDE2 and LATITUDE2 as shown in FIG. 2. Based on the movement of the boat 10, represented by vector 20, the "course over ground", or COG, can be identified by the magnitude of angle $\theta$. In addition, by knowing the distance, or length of vector 20, and knowing the time that elapsed between the two positions of the boat shown in FIG. 2, the "speed over ground", or SOG, can be determined. Typically, the SOG is represented as meters per second or miles per hour.

Those skilled in the art of GPS technology are familiar with many different types of sophisticated hardware and software that provide much more detailed and complex information than is described above in conjunction with FIGS. 1 and 2. However, for an explanation and description of the preferred embodiments of the present invention, it is only necessary to understand that a GPS receiver is able to provide the longitude and latitude where the receiver is located and is able to also provide information relating to the speed over ground, or SOG, and the course over ground, or COG, of the GPS receiver. The manner in which this information is presented to the user of the GPS receiver can vary from one receiver to another depending on its particular design and intended purpose.

Figure 3:
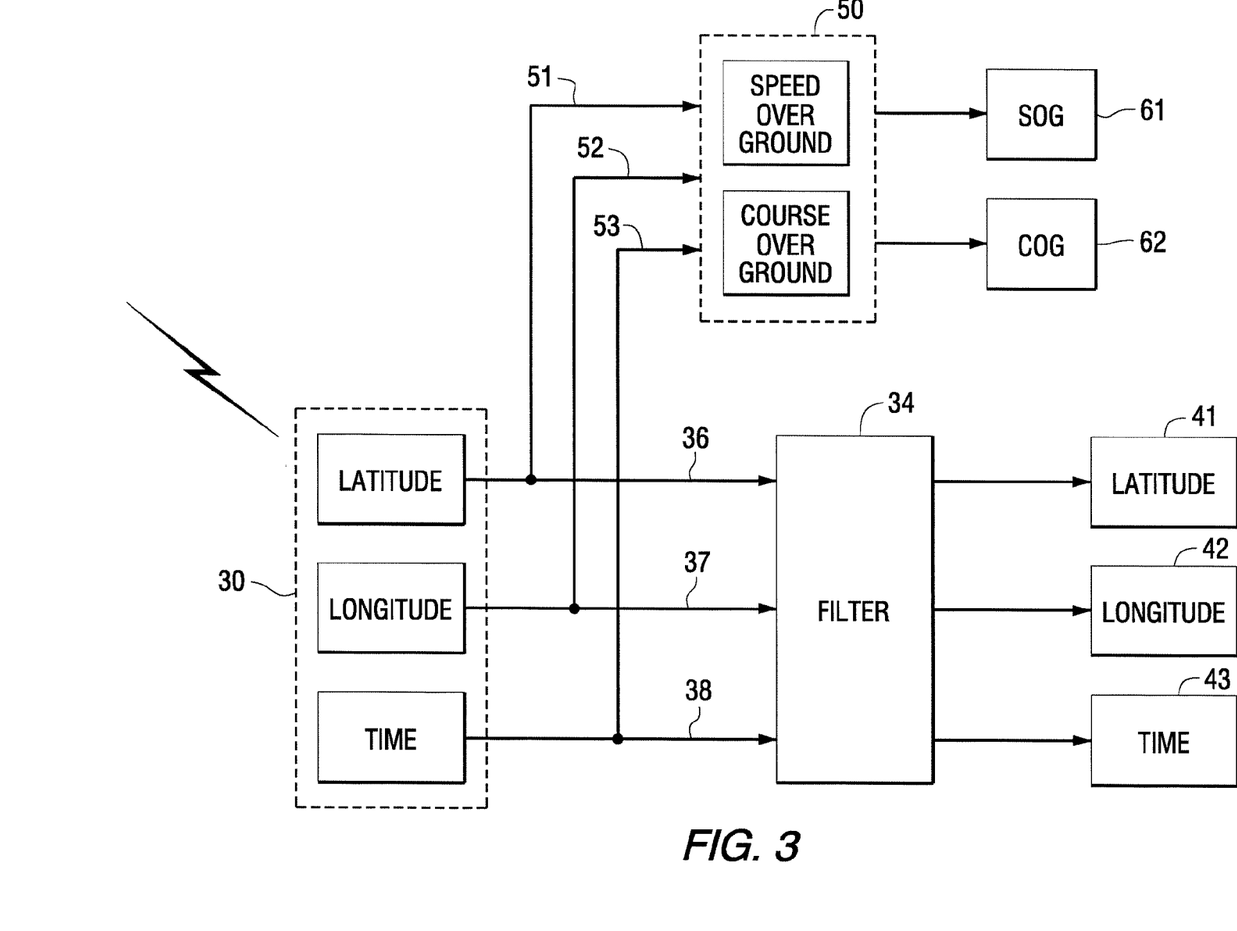
FIG. 3 is a simplified block diagram of the functional components of a GPS receiver.

FIG. 3 is a simplified block diagram of a GPS receiver. Although it should be realized that different manufacturers of GPS receivers can configure the individual components and software programs differently, the basic characteristics of a GPS receiver that are important to the present invention will generally be available in one form or another. These characteristics will be described in greater detail below.

In FIG. 3, the basic information received from the GPS satellites comprises the time at which a signal is sent by the satellite and information relating to the position of the satellite transmitting the time-related data. When received by the GPS receiver, this information allows the software in the receiver to calculate the signal transit time that elapsed between the transmission of the signal by the satellite and the receipt of the signal by the GPS receiver. This information, along with the speed of light, allows the GPS receiver to calculate the distance between the satellite and the receiver. Each satellite transmits its position and its precise on board clock time to earth at a predetermined frequency. Since these signals are transmitted at the speed of light, they require approximately 67.3 milliseconds to reach a position on the earth's surface that is located directly below the satellite. If the precise distance to four independent satellites is known, the software contained in the GPS receiver is able to calculate the position of the receiver in terms of its longitude and latitude. In the simplified block diagram shown in FIG. 3, the information is received by a portion of the software that is represented by dashed line box 30. This software is able to make the necessary computations to determine the longitude and latitude of the receiver. For purposes of the description of the basic concepts of the preferred embodiment of the present invention, this information, as received by the GPS receiver, will be referred to as "unfiltered data" because it is the raw data calculated as a function of the information received from the satellites without any type of mathematical or electronic filtering. Those skilled in the art of GPS receivers are familiar with many possible types of filtering techniques, including the use of Kalman filters that can be provided with the results of smoothing the data. To some degree these filters tend to decrease rapidly changing information that is sometimes referred to as "dither." Some of the information provided by the GPS receiver benefits from this smoothing or filtering. Although the Kalman filters are complex mathematical devices, a highly simplified example can explain one of the effects of the use of filters. As will be described in greater detail below, there are many different sources of error that can occur during the transmission and receipt of time signals from GPS satellites. In addition, the techniques used in the normal functioning of a GPS system are subject to very large discrepancies that can result from very small errors or differences in measurement from one instance to another. For example, since the calculations use the speed of light and this value is multiplied by a measured time period, very small errors in the measurement of this transit time can result in very large errors in the calculated distance between the satellite and the GPS receiver. This same calculation must be made four times, with respect to four satellites, in order to calculate the position of the GPS receiver. Therefore, it can be seen that the computed position of a GPS receiver can vary significantly from one sequential measurement to another.

In GPS systems, several causes can contribute to the overall error of the distance measurement and the variability between sequential data values. For example, even though each GPS satellite is provided with four atomic clocks on board, a time error of 10 nanoseconds can create a position error of approximately three meters. The position of any particular satellite is generally known only to within approximately one to five meters. The signals from the satellites, which travel at the speed of light, can slow down when traversing the ionosphere and troposphere and therefore this speed cannot be known precisely or assumed to be constant in all cases. Furthermore, when the GPS receiver receives the signal from a satellite, it is generally only able to determine the time of that receipt within a range of approximately 10 to 20 nanoseconds. Unfortunately, this corresponds to a positional error of approximately three to six meters. The effects of these errors can be exaggerated if the four selected satellites are in disadvantageous positions relative to each other. This type of effect on the accuracy of the measurement is referred to as the geometric dilution of precision, or GDOPIn summary, numerous environmental, situational, and positional characteristics can introduce error into the calculation of the position of the GPS receiver. The effects of the ionosphere can account for an error of approximately four meters, clock errors can cause an additional error of approximately two meters, GPS receiver measurements can account for an additional 0.5 meters, ephemeris data can be responsible for approximately two meters, the effects of the troposphere can account for slightly less than a meter and multipath errors can account for an additional 1.4 meters of error. As is understood by those skilled in the art of GPS receivers, multipath errors are caused by the fact that the transmitted signal from a satellite can be reflected by buildings, trees, and other structures which distort the path between the satellite and the receiver. Those skilled in the art of GPS technology are familiar with all of these sources of potential error and, in recent years, various techniques have been developed to account for the errors and to accommodate them. In order to understand the basic concepts of the present invention, it is helpful to recognize the existence of these errors and acknowledge the effect that the errors have on the magnitude of the signals received by the GPS receiver. In many applications, this type of signal variability can be considered to be highly disadvantageous, but the preferred embodiments of the present invention are able to take advantage of this variability in order to be able to validate incoming signals and the data calculated from those signals. In other words, the present invention uses potentially disadvantageous error inducing characteristics for the advantageous purpose of assessing the validity of the signals processed by the GPS receiver.

With continued reference to FIG. 3, the latitude, longitude and time information shown in dashed box 30 is communicated to a filter 34, as represented by lines 36, 37, and 38. The filter performs various mathematical operations on this information and, in certain designs of GPS receivers, electronic circuitry is also used to affect the values of these signals. As a result, smoothed representations of the latitude 41, longitude 42, and time 43 are provided as outputs from the filtering components and are made available to the user of the GPS receiver. With respect to the latitude and longitude, 41 and 42, it is often helpful to provide smoothed information in order to prevent rapidly changing values of this information. Since, in most cases, the user of a GPS receiver is not moving at speeds that are high enough to warrant the need for rapidly identifying minute changes in the latitude or longitude of the receiver's position. Therefore, providing an output signal that rapidly changes with each update of the data is often more distracting than helpful. It should be understood that the primary function of the filters is often more related to the elimination of error or the combination of various corrective schemes than to the smoothing of data, but it should also be recognized that the filtered output data often changes much more slowly as a result of the filtering process performed by the components and/or software represented by block 34 in FIG. 3.

With continued reference to FIG. 3, another portion of the receiver is represented by dashed line box 50 that is intended to illustrate the software used to calculate the speed over ground (SOG) and course over ground (COG) that is also provided by the GPS receiver in many applications. The information relating to latitude, longitude, and time is provided directly from the software associated with dashed line box 30, on lines 51-53, and is used to perform the necessary calculations to determine the SOG and COG, 61 and 62, that are also provided as outputs to the user of the GPS receiver. It should be noted that the portion of the software identified by reference numeral 50 in FIG. 3 uses unfiltered information relating to the position and time provided by dashed line box 30, whereas the information identified by reference numerals 41-43 are derived from filtered data. The result is that the SOG and COG information will change rapidly and, in some circumstances, without any easily identifiable cause.

Figure 4:
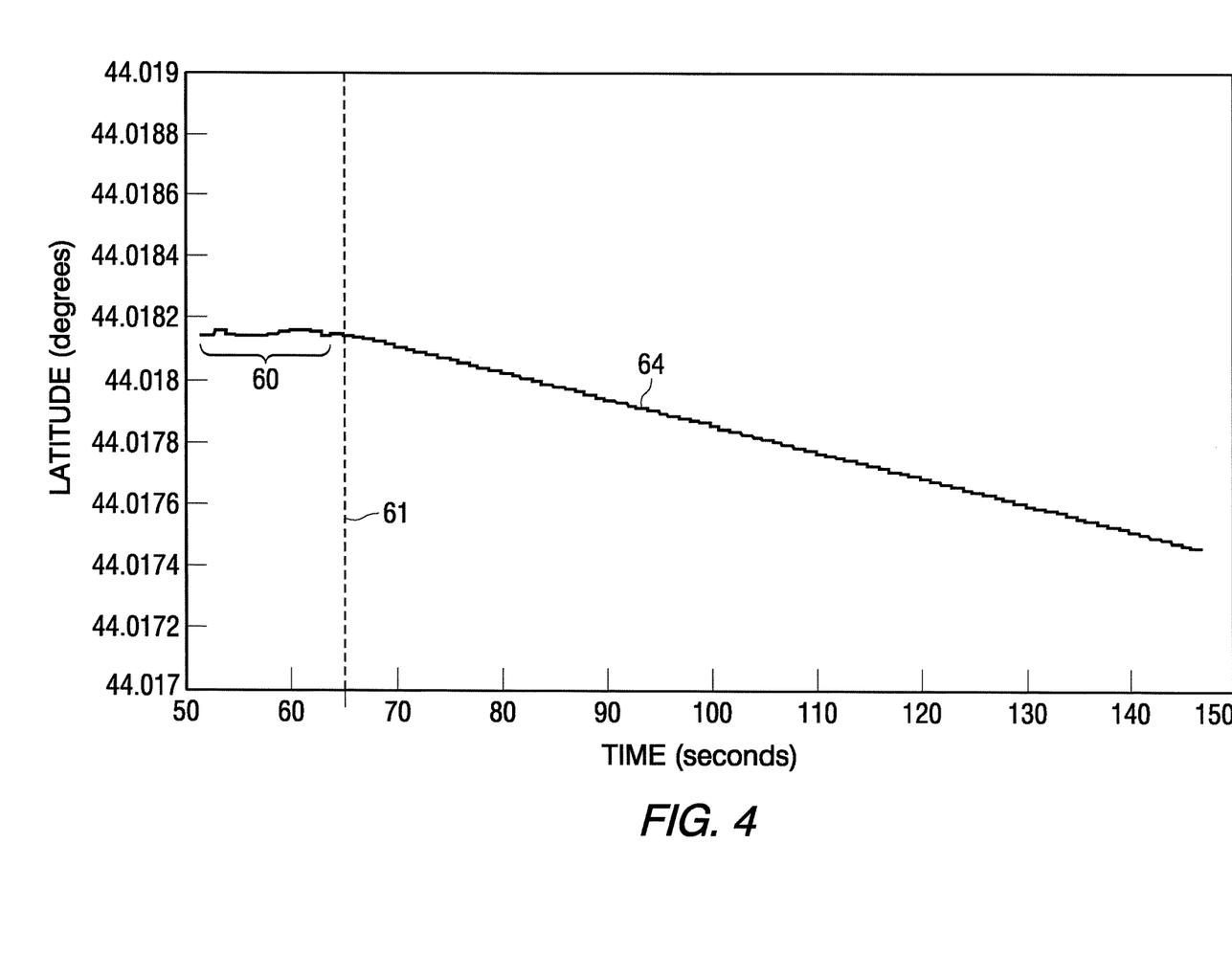
FIG. 4 is a time-based graphical representation of a latitude signal showing the magnitude of the signal before and after a loss of fix.

FIG. 4 is a time-based graphical representation of a latitude output such as that identified by reference numeral 41 in FIG. 3 and described above. In the portion of the graph in FIG. 4 identified by reference numeral 60, the latitude information shows some slight change from one instant to the next, but the data are generally smoothed as a function of the operation of the filter 34 described above in conjunction with FIG. 3. Then, at a time of approximately 66 seconds represented on the horizontal axis of FIG. 4, the information transmitted by the GPS satellites was intentionally and artificially blocked to prevent the receiver from properly receiving this information. In FIG. 4, the output from the GPS receiver graphically exhibits the effect caused by the filtering performed by its electronic and/or mathematical components. Rather than immediately providing either an alarm signal or a zero latitude output, the data output of the latitude is shown continuing to decay over time as represented by the consistently decreasing output signal provided by the receiver. This gradual decay illustrated by the output signal of the GPS receiver is caused by the fact that the receiver performs a filtering function, either mathematically or electronically, on the input information after it is received from the GPS satellite and as the data from the four satellites are converted to longitude and latitude information for display to the user of the GPS receiver and, in many instances, for the use by a propulsion and control system which automatically affects the position and movement of a vehicle, such as a marine vessel. This output signal 64, which began with the intentional blocking of the incoming satellite signal at point 61, can be significantly disadvantageous because it could logically be interpreted as a valid latitude position by other software that uses the positional data to control the movement of a vehicle, such as a marine vessel. One such type of system is a "station keeping" control system that is intended to maintain the heading and position of a marine vessel without the need for manual intervention. When properly functioning, the marine propulsion system is controlled in such a way that the marine vessel remains motionless and in a heading position preselected by the operator of the vessel. In other words, once selected by the operator of the marine vessel, the control system maintains the position of the boat as if it was at anchor. A system of this general type is described in detail in U.S. Pat. No. 7,305,928. Any time the vessel moves, such as might be caused by current, tides, or wind, the propulsion system automatically corrects for this movement and causes the boat to move back into its position and heading selected by the operator. In actual practice, the station keeping system is intended to react very quickly to any perceived movement of the marine vessel away from its intended position and heading direction. When operating correctly, the automatic station keeping system reacts with sufficient speed to correct for a perceived movement away from the desired position and heading before it is noticeable to the operator of the marine vessel. If, even with the boat actually remaining perfectly stationary, the latitude signal shown in FIG. 4 is provided to the control system, the marine vessel will be moved in a misguided attempt to return it to the original latitude represented by reference numeral 60 in FIG. 4. It should be understood that although only a latitude is shown in FIG. 4, similar results would be experienced with regard to the longitude of the marine vessel. The results of this type of error can be significantly deleterious in a worse case scenario, resulting in damage to property and potential injury to people. It would therefore be significantly beneficial if the condition shown in FIG. 4, to the right of dashed line 61, could be quickly identified so that the automatic control system is able to be deactivated and the operator of the marine vessel notified that the GPS system is not operating properly. This declaration of an invalid input signal should be much quicker than would otherwise be available through the normal operation of the GPS receiver. The majority of currently available GPS receivers are able to report a "fix" or "no fix" status via either MMEA or CAN based data, but this status report can be slow to update and, in certain instances, may take over 60 seconds to react to a loss of fix. During this time, before the GPS device reacts to the loss of fix, the GPS receiver would continue to report that a proper fix exists, but the position and heading information is actually incorrect. As described above, if an automatic propulsion system continues to use this data, after the time represented by dashed line 61 in FIG. 4, damage can occur. One of the primary purposes of the preferred embodiments of the present invention is to identify the "no fix" condition more quickly than is currently available with existing GPS systems.

As described above, numerous causes can result in errors in GPS data. Throughout the description of the preferred embodiments of the present invention, the term "error" is used in conjunction with GPS receiver data to describe certain effects which may not always be erroneous in the normal definition of that word. If a certain variable (e.g. the distance between a GPS satellite and a GPS receiver on earth) is obtained numerous sequential times with different results and no intervening movement of either the satellite or the receiver has occurred, obviously not all of the measurements can be correct and some of them must therefore be erroneous. Some of the "errors" are explainable for the reasons described above. In some cases, no matter how accurate a measurement system is, it must have some limitation as to its resolution. Even if that resolution is 64 bits, a slight natural variation in the measured variable beyond the $64^{th}$ bit can result in two sequential measurements being different from each other. If that particular variable is multiplied by an extremely large constant (e.g. the speed of light), the difference between two sequential distance calculations can be appreciable and can contribute to a perceived "error". In some situations, this "error" in sequential measurements of the same variable may be referred to as "variation" in the magnitude of the variable. This variability is often referred to as "dither." It is this characteristic that can be considered annoying or distracting to some users of a GPS receiver. However, this same characteristic is taken advantage of by preferred embodiments of the present invention to provide a very significant benefit that enables the present invention to reach beneficial conclusions about the validity of the data being used by the GPS receiver in the automatic control of a vehicle control system. This characteristic, which is considered distracting or annoying to some users of GPS devices, is advantageously used by preferred embodiments of the present invention to perform a very valuable service that might not otherwise be available or might take much longer to achieve than is affordable in maintaining the safe control of the propulsion and guidance system of a vehicle, such as a marine vessel. In some instances, these errors are relatively minor and explainable but exist nonetheless. During the investigation of the problems associated with the results illustrated in FIG. 4, it was advantageously recognized that this potentially annoying or distracting characteristic relating to unfiltered data can be used in a beneficial way.

Figure 5:
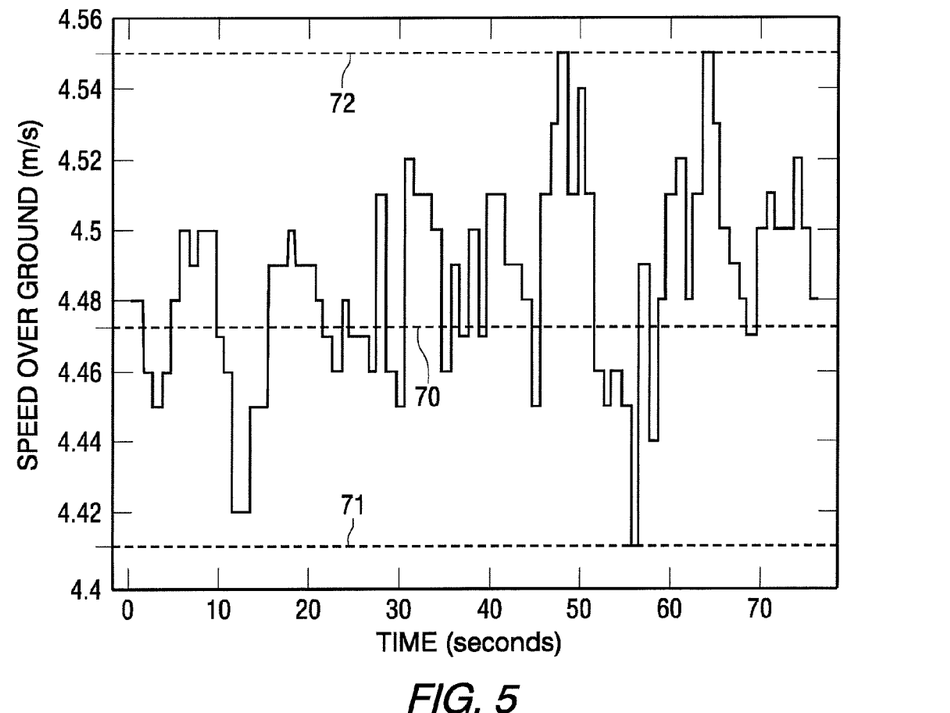
FIG. 5 shows a speed over ground, or SOG, signal in a time-based graph.

FIG. 5 is a time-based graphical representation of the calculated speed over ground, or SOG, of a marine vessel traveling at approximately 10 miles per hour. It should be understood that the speed of the marine vessel was controlled manually and therefore was not held perfectly constant. In FIG. 5, three horizontal dashed lines are provided for reference. Dashed line 70 represents a speed over ground of approximately 10 miles per hour or 4.4 meters per second. Dashed line 71 represents a speed over ground of 9.86 miles per hour or 4.41 meters per second. Dashed line 72 represents a speed over ground of 10.18 miles per hour or 4.55 meters per second. Although some of the variability illustrated by the signal in FIG. 5 can be attributed to the variation in boat speed even though an attempt was made to manually control the speed to 10 miles per hour. This variation may have been caused by wind, current, or human variability. However, it is also important to note that relatively rapid changes exist in the data that are probably not the cause of wind, current, or human error. Many of these changes occur numerous times within a 10 second interval and are therefore probably the cause of the GPS errors of variability described above.

Figure 6:
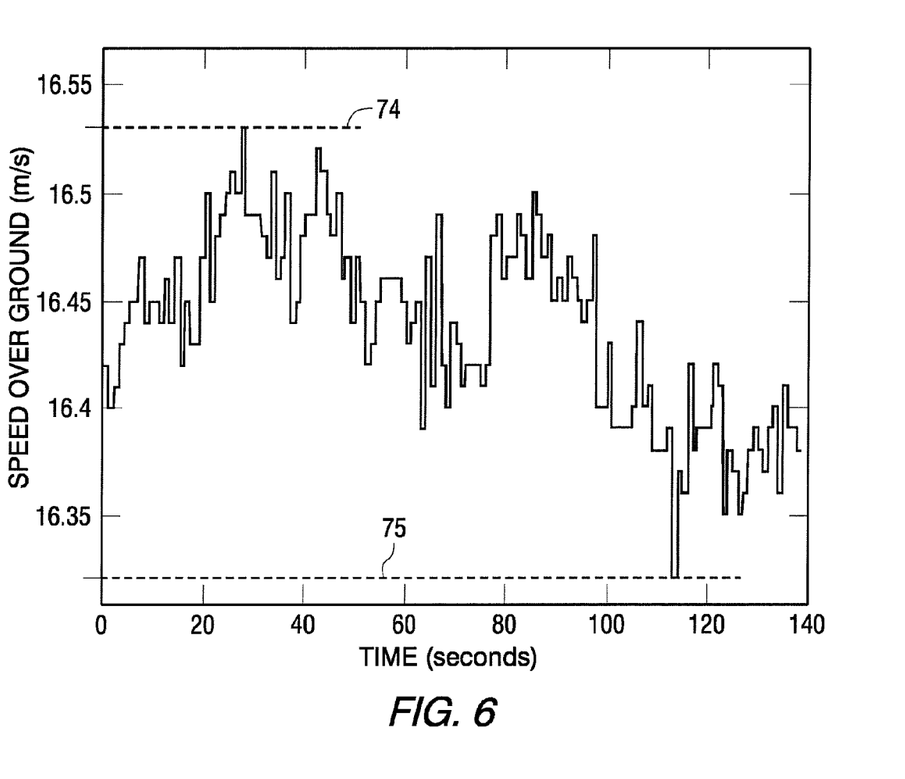
FIG. 6 is generally similar to FIG. 5, but at a different speed.

FIG. 6 is generally similar to FIG. 5, but with the operator of the marine vessel attempting to maintain the speed over ground at a slightly higher magnitude. Again, two dashed lines, 74 and 75, are used to identify two values of SOG for reference. Dashed line 74 represents a boat speed of 37 miles per hour or 16.54 meters per second. Dashed line 75 represents a boat speed of 36.5 miles per hour or 16.315 meters per second. Notwithstanding the difficulty in manually controlling the vessel speed to precise values, it can be seen that the dither of the signal is clearly evident in FIG. 6. Again, this SOG information is obtained by using unfiltered data as shown in FIG. 3 by dashed line boxes 50 and 30 and lines 51-53. The unfiltered nature of the information used to calculate SOG and COG results in the magnitude of variability, or dither, which can be distracting, but which the present invention takes advantage of in order to perform a significantly beneficial function as will be described below.

Figure 7:
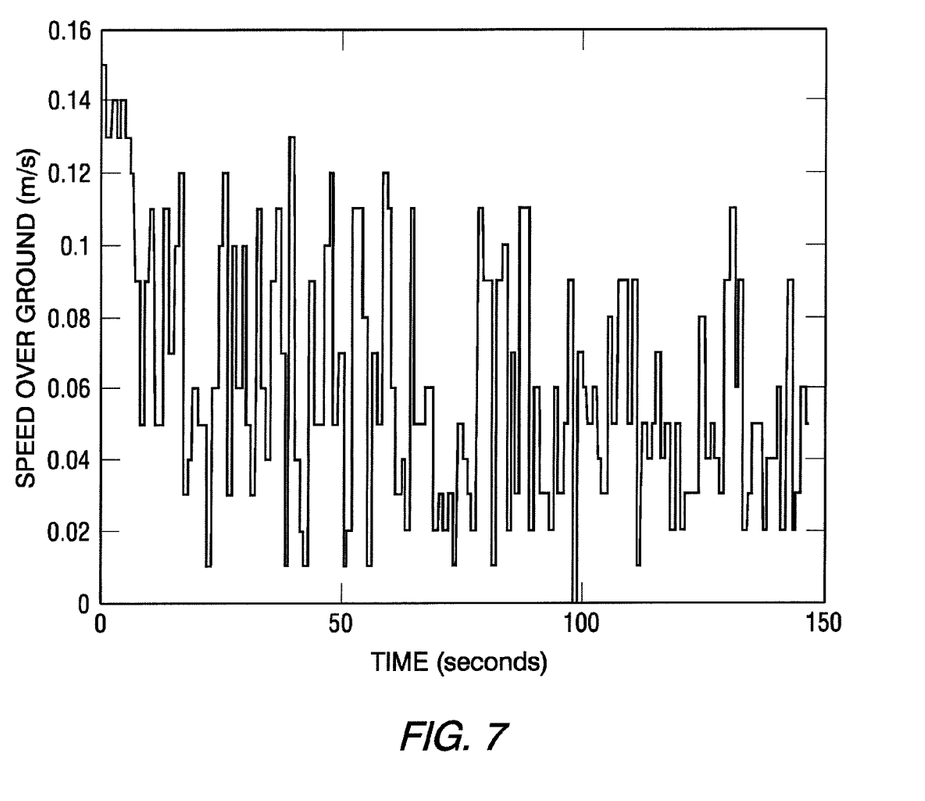
FIG. 7 is similar to FIGS. 5 and 6, but for a stationary GPS receiver.

Although the variability, or dither, of the data is evident in FIGS. 5 and 6, it is more significantly obvious in FIG. 7, particularly since the information that is graphically illustrated in FIG. 7 was provided by a GPS receiver attached to a marine vessel that was sitting on a boat trailer on dry land. In other words, no movement whatsoever was occurring with respect to the marine vessel, the GPS receiver, or the boat trailer and yet the graphical representation of speed over ground, or SOG, shown in FIG. 7 would indicate an output signal of approximately 0.313 miles per hour or 0.14 meters per second near its highest point. It must be remembered that this GPS receiver was perfectly stationary and on dry land when the graphical signals shown in FIG. 7 were recorded. The dither illustrated in FIG. 7 was not caused in any way by manual error or the variability caused by the inability of the operator of the marine vessel to maintain a steady speed over ground, or SOG. This dither, or variation in signal magnitude, is caused solely by the various contributors to error and the use of extremely high values (e.g. the speed of light) which significantly magnify the effects of any small variation in measurement. The results shown in FIG. 7, in view of the fact that the dither illustrated graphically is inherent and not caused in any way by manual error, are very revealing and provide the basis for the technique of the preferred embodiments of the present invention which take advantage of this otherwise distracting characteristic caused by the dither and provide the significant benefit of being able to determine the validity of the data produced within the GPS receiver.

Figure 8:
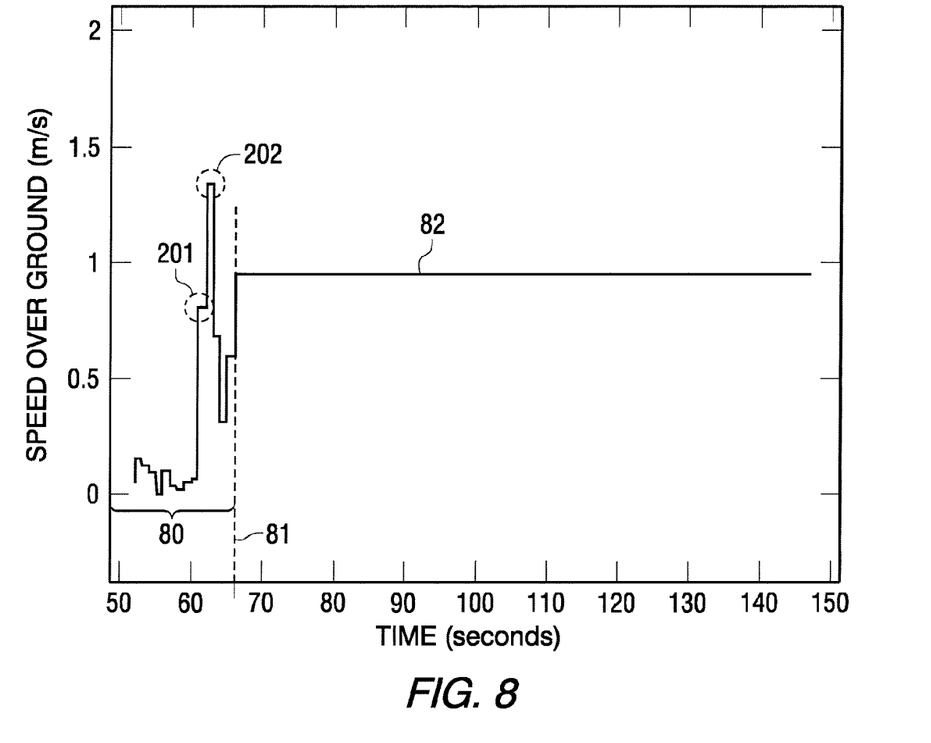
FIG. 8 shows a speed over ground signal, in a time-based graph, illustrating the values received before and after a loss of fix occurrence.

FIG. 8 illustrates the effect of an artificial blockage of a transmitted signal from a GPS satellite to a GPS receiver. It illustrates an important characteristic that the preferred embodiments of the present invention take advantage of in order to more quickly identify a loss of fix. Prior to a time of 56 seconds, the data in FIG. 8 show the normal variability or dither in the region identified by reference numeral 80, with the GPS receiver sitting on dry land with the marine vessel on a trailer. At the time identified by dashed line 81, the signal is artificially blocked by covering the GPS receiver with a metallic foil. Immediately after this artificial blockage of the transmitted signal from the satellite, the line 82 became perfectly horizontal and showed no variation whatsoever. In other words, a "loss of fix" was caused artificially. When this result was observed, it was recognized as an opportunity to monitor the SOG signal (or COG signal) for its variability and use this characteristic as an indicator of whether or not the receiver had a fix or, alternatively, was in a loss of fix condition. In other words, this variability that is evident in FIG. 8 can be used as a trustworthy indicator of the validity of the data being used by the GPS receiver.

Figure 9:
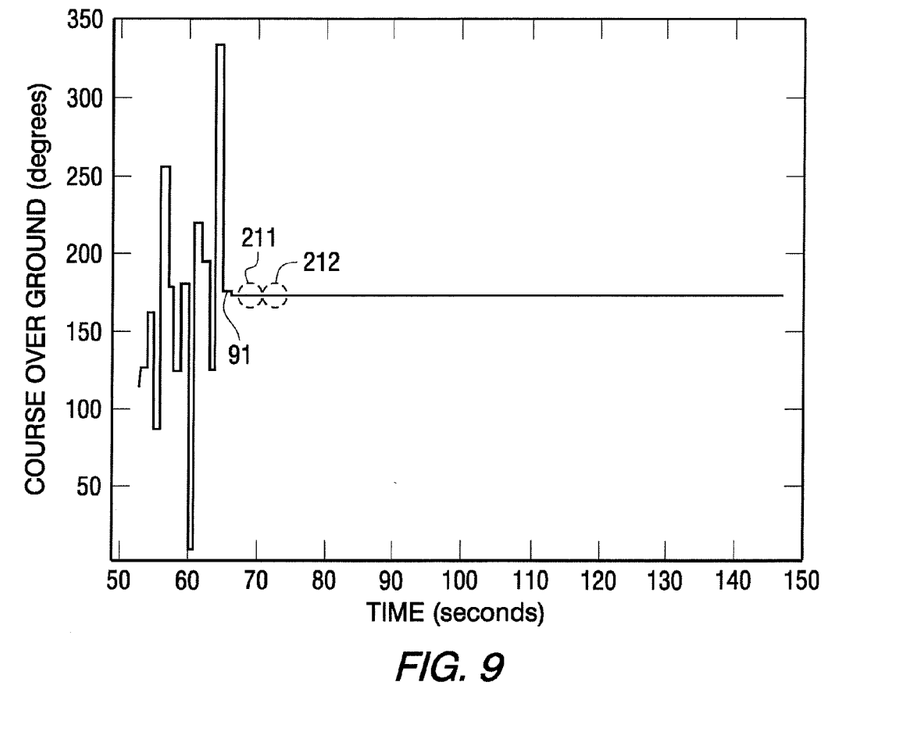
FIG. 9 is generally similar to FIG. 8, but in conjunction with a course over ground, or COG, time-based graph.

FIG. 9 is a graphical representation of the course over ground, or COG, signal provided by a GPS receiver. Again, this receiver was on a stationary boat that was taken out of the water and stored on a trailer. Therefore, it was not moving in any direction at any speed. To the left of the point identified by reference numeral 91, the output signal exhibited significant variation, or dither. This can be explained by the fact that the COG is calculated by mathematically determining the magnitude of movement, as represented by vector 20 in FIG. 2, and the direction of this movement which is represented by angle θ. Even an extremely small movement (e.g. a meter or less) which is easily explained by the numerous potential causes of error described above, can be calculated and a direction, or course, can be determined. If this movement is in a generally northward direction, the magnitude of angle θ can be either relatively low numbers (e.g. ≦90 degrees) if the course is north by northeast or extremely large numbers (e.g. ≧270 degrees) if the course is north by northwest. Therefore, the dither to the left of point 91 in FIG. 9 is easily explained. However, the important result shown in FIG. 9 is that this variation or dither immediately ceases when the signal is blocked to prevent the GPS receiver from receiving the signal from the GPS satellite. Therefore, by monitoring the variation or dither in the signal, the validity of the operation of the GPS receiver can be determined. The variation to the left of point 91 in FIG. 9 indicates the valid receipt of transmitted data and the valid operation of the GPS receiver even though it is recognized that the large variation in COG can be caused by relative minor errors as described above. The important result shown in FIG. 9 is that the validity of the signal can be accurately and quickly determined.

Figure 10:
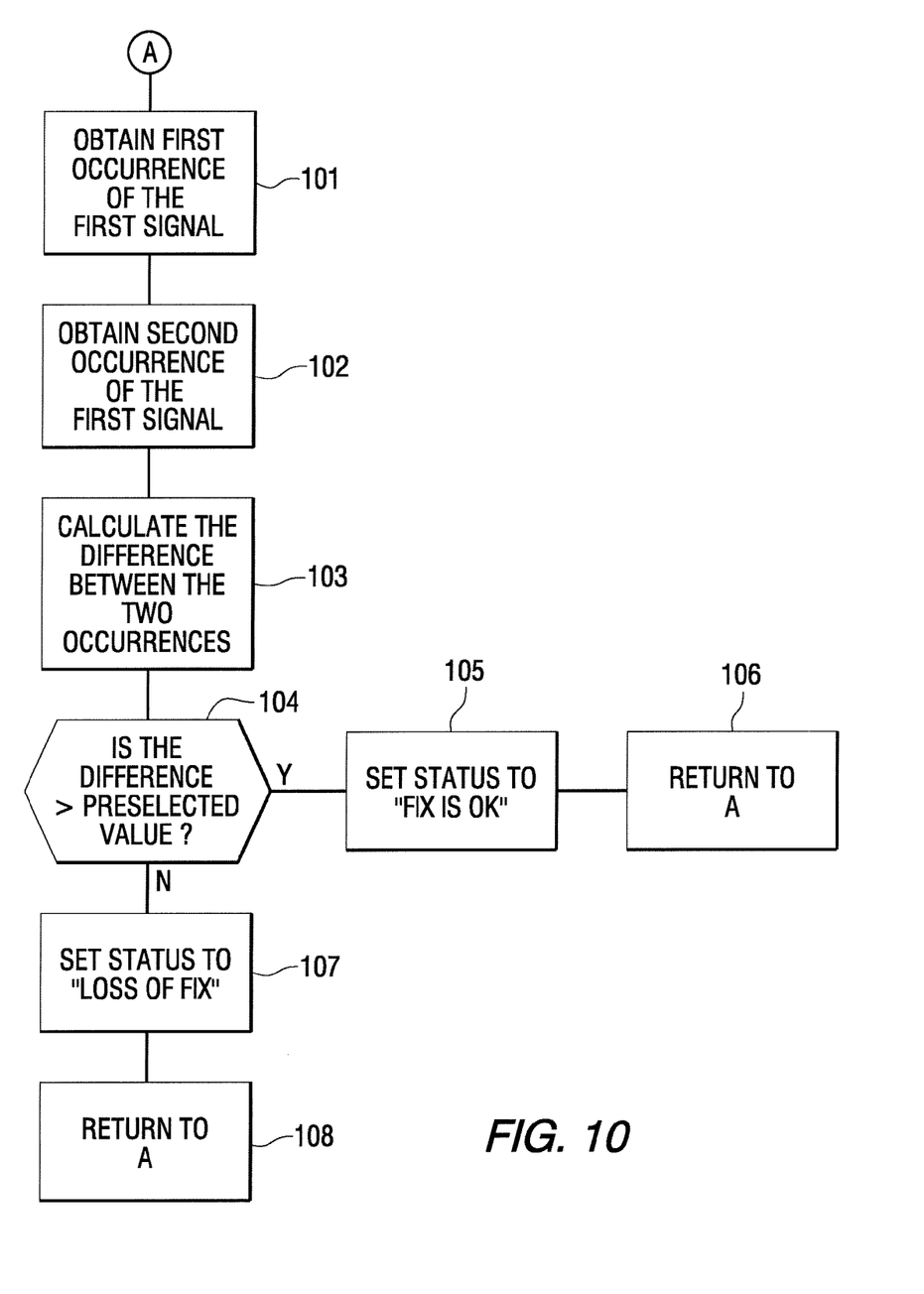
FIG. 10 is a functional flowchart illustrating a software routine that performs the basic function of a preferred embodiment of the present invention.

FIG. 10 is a simplified flowchart showing how the preferred embodiments of the present invention are able to take advantage of the characteristics described above, regarding the variation of dither of the unfiltered data, to characterize the validity of the GPS signal.

Beginning at functional block 101, the program obtains a first occurrence of a first signal. With reference to FIG. 8, this first occurrence can be the magnitude identified by reference numeral 201. With continued reference to FIGS. 8 and 10, functional block 102 indicates that the program obtains a second occurrence of the first signal. This second occurrence can be the data represented by reference numeral 202 in FIG. 8 and the first signal, with regard to both functional blocks 101 and 102, can be the SOG represented in FIG. 8. At functional block 103, the program calculates the difference between the two occurrences. If the magnitudes of the first and second occurrences, 201 and 202, are approximately 0.7 meters per second and 1.4 meters per second, the difference is approximately 0.7 meters per second. It will be appreciated that the precise difference between the first and second occurrences is not as critical as is the fact that the difference is a non-zero value.

With continued reference to FIGS. 8 and 10, functional block 107 compares the difference to a preselected value. The preselected value can be a value such as zero or some non-zero, but very small, number. This enables the software to distinguish between the condition to the left of dashed line 81 in FIG. 8 and the condition to the right of the dashed line 81. If the difference is greater than the preselected value, the software determines that the "fix is okay" as represented by functional block 105. This status is reported to the other portions of the vessel control system and to the operator in some instances. This indicates that the data are valid and the operation of the GPS receiver is normal. This condition is similar to that shown to the left of dashed line 81 in FIG. 8. However, if the operations represented by functional block 101-104 are performed after the 66$^{th}$ second in FIG. 8, the difference would not be greater than the preselected value since the difference would be generally equal to zero for all such comparisons made after the 66$^{th}$ second. As a result, functional block 107 would determine that the data are invalid because of a loss of fix. Functional block 108, as did functional block 106, would return to the beginning of the routine to repeat the comparison. It should be understood that the comparison is made dynamically and, although it was described in relation to historic data shown in FIG. 8, each comparison would be between the most recent occurrence of data acquired and the previous occurrence.

In a particularly preferred embodiment of the present invention, the occurrences of data are both serial and sequential. In other words, the comparisons are made between two sequential occurrences with one following immediately after the other. However, it should be understood that this is not always a requirement of the present invention. In alternative embodiments, the software may be designed to skip a preselected number of occurrences before selecting a subsequent occurrence for the comparison. This selection procedure should not be considered to be limiting to the present invention although a particularly preferred embodiment of the present invention uses two immediately sequential occurrences of data. The example described immediately above relates to the use of the SOG for the purpose of determining the validity of the GPS receiver operation. Alternatively, the COG could have been used. Unfiltered data, such as SOG or COG in the example described above, are suitable for these purposes because the unfiltered data exhibit sufficient variability or dither to allow for the comparisons described above.

With reference to FIGS. 9 and 10, it can seen that if the first and second occurrences described in functional blocks 101 and 102 are those occurrences identified in FIG. 9 by reference numerals 211 and 212, the difference between the two occurrences would be zero and the decision made at functional block 104 would be negative. This would result in the status being set to a "loss of fix" which would identify the signal as being invalid. It can be seen that both the SOG in FIG. 8 and the COG in FIG. 9 can be used to rapidly identify the GPS receiver signal as being valid or invalid. Because the signals are unfiltered, the situation described above in conjunction with FIG. 4 can be avoided.

It can be seen that a method for monitoring the operation of a GPS receiver, in accordance with a preferred embodiment of the present invention, comprises the steps of receiving a first magnitude of a first occurrence of a first signal, receiving a second magnitude of a second occurrence of the first signal, calculating a change between the first and second magnitudes, and identifying an inoperative condition of the receiver when the degree of change between the first and second magnitudes is less than a preselected threshold value. The change can be an absolute value of a difference calculated by subtracting the second magnitude from the first magnitude. In a preferred embodiment of the present invention, the first and second occurrences are sequential but, as described above, this is not a requirement in all embodiments of the present invention.

In alternative embodiments of the present invention, the change can also be determined as a function of a ratio calculated by dividing the second magnitude by the first magnitude or vice versa. In this alternative embodiment of the present invention, the resulting ratio would be generally equal to unity if there is no change between the first and second magnitudes. The difference between the calculated ratio and the value of 1.00 would represent the variability and, as a result, the validity of the monitored signal. The first signal, in a preferred embodiment of the present invention, can be a representation of a speed over ground or course over ground signal provided by the global positioning system receiver.

Alternatively stated, the method of a preferred embodiment of the present invention can comprise the steps of receiving a first magnitude of a first signal at a first point in time, receiving a second magnitude of the first signal at a second point in time, determining a degree of change between the first and second magnitudes, and characterizing the operation of the receiver as a function of the degree of change. The degree of change can be mathematically calculated by subtracting the second magnitude from the first magnitude and, in a preferred embodiment of the present invention, an absolute value can be taken of that difference. The absolute value of the difference would represent the validity of the signal and subtracting a preselected value from that degree of change would determine whether or not sufficient change is observed to signify a signal that is sufficiently valid to warrant its use in a control system.

In the embodiment of the present invention described above, the signal being monitored is described as an unfiltered input received from a GPS satellite. The term "unfiltered" is used herein to describe a series of data values or magnitudes that has not undergone a mathematical or electronic manipulation that artificially decreases its variability or its amount of dither. This manipulation could occur as a result of the use of a Kalman filter. In its simplest form, the mathematical manipulation can comprise the determination of a moving average, taken over a series of occurrences, which smoothes the data. Although it is common to find a GPS receiver that filters the data for display of the longitude and latitude results while not filtering the SOG and COG results, it should be understood that alternative configurations of the software within the GPS receiver can also be used in combination with the basic concepts of preferred embodiments of the present invention. By "unfiltered" as used herein, this term indicates that the data are not manipulated to the extent that its variability can no longer be used as an indication of the continuing variation of the received data transmitted by a GPS satellite and received by the GPS receiver. In the examples described above, the SOG and COG data are unfiltered and suitable for use by the method of preferred embodiments of the present invention whereas the longitude and latitude displayed by the GPS receiver is filtered and unsuitable for these purposes.

Notwithstanding the use of the terms "filtered" and "unfiltered", it should be understood that, in certain preferred embodiments of the present invention a method for testing the validity and acceptability of incoming signals can, by its very nature, introduce a certain degree of "filtering". This is acceptable and is not considered to be filtering within that definition used herein. In making the judgment of whether or not an incoming signal is invalid because the GPS device has lost its fix, it is very beneficial to avoid making an erroneous judgment based on a coincidental inherent characteristic of the data. For example, it is possible that a perfectly valid signal, for SOG or COG as an example, exhibits two or more sequential values that are precisely equal to each other. It is necessary to avoid a premature judgment of invalidity in situations like this. It is also beneficial if a judgment of invalidity can be made rather quickly in order to avoid having a propulsion system control the movement of a marine vessel based on invalid data for an extended period of time. To avoid both of these types of error in judgment, it is sometimes necessary to make some compromises. One type of compromise is to implement an "X out of Y" criteria system. Simply stated, this type of system bases the validity judgment on an observance of X occurrences in Y observances. As an example, in order to judge the incoming signal as being invalid for loss of a fix, six occurrences of apparently faulty values must be observed within ten observances of values. As described above, a single occurrence would be determined to be faulty if no change in magnitude is observed relative to the most recent previous value. If six observances have no change in magnitude, in comparison to their previous values, within the span of ten total observances, the incoming data is judged to have lost fix. If less than six occurrences of this type are observed, the incoming data is judged to be valid. The implementation of this type of "X out of Y" methodology can, in itself, create the effect of a slight degree of "filtering". However, since this effect is caused by the methodology of judgment itself, after the data has already been received and is being reviewed, it is not considered to be "filtered" in the sense that that terminology is used in the description above.

Although the present invention has been described with particular detail and illustrated to specifically show various preferred embodiments, it should be understood that alternative embodiments are also within the scope of the present invention.

I claim:

1. A method for monitoring the operation of a receiver, comprising the steps of:
   determining a magnitude of a difference between two occurrences of a first signal;
   comparing said magnitude of said difference to a preselected threshold value; and
   identifying an operating condition of said receiver as a function of the relative magnitudes of said difference between said two occurrences and said preselected threshold value, wherein said identifying step comprises the step of determining that said receiver is inoperative if the absolute value of said difference is not greater than said preselected threshold value.

2. The method of claim 1, wherein:
   said first signal comprises a plurality of serial occurrences.

3. The method of claim 1, wherein:
   said comparing step comprises the step of subtracting one of said two occurrences from another of said two occurrences to calculate said difference between said two occurrences.

4. The method of claim 1, wherein:
   said two occurrences of said first signal are sequential occurrences.

5. The method of claim 1, further comprising:
   causing an alarm to be generated when said identifying step determines that said difference is less than or equal to said threshold value.

6. The method of claim 1, wherein:
   said first signal is unfiltered.

7. The method of claim 1, wherein:
   said operating condition is the validity of said first signal.

8. The method of claim 1, wherein:
   said receiver is a global positioning system receiver.

9. A method for monitoring the operation of a receiver, comprising the steps of:
   receiving a first magnitude of a first occurrence of a first signal;
   receiving a second magnitude of a second occurrence of said first signal;
   calculating a change between said first and second magnitudes; and
   identifying an inoperative condition of said receiver when the degree of change between said first and second magnitudes is less than a preselected threshold value.

10. The method of claim 9, wherein:
    said first and second occurrences are sequential.

11. The method of claim 9, wherein:
    said change is determined as a function of a ratio calculated by dividing said second magnitude by said first magnitude.

12. The method of claim 9, wherein:
    said first signal is a representation of a speed over ground signal provided by a global positioning system receiver.

13. The method of claim 9, wherein:
    said degree of change is a difference calculated by subtracting said second magnitude from said first magnitude.

* * * * *